3,823,159
O-(SUBSTITUTED CARBAMOYL)-3-PYRROLIDINO-PROPIO AND BUTYROPHENONE OXIMES
Marvin J. Karten, Ardsley, N.Y., assignor to USV Pharmaceutical Corporation, Tuckahoe, N.Y.
No Drawing. Continuation-in-part of application Ser. No. 877,822, Nov. 18, 1969, now Patent No. 3,636,111, which is a continuation-in-part of application Ser. No. 714,450, Mar. 20, 1968, which in turn is a continuation-in-part of application Ser. No. 680,048, Nov. 2, 1967, both now abandoned. This application May 7, 1971, Ser. No. 141,374
Int. Cl. C07d 27/04
U.S. Cl. 260—326.3        12 Claims

ABSTRACT OF THE DISCLOSURE

Compounds of the formula

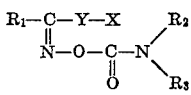

wherein $R_1$ and $R_3$ are lower aliphatic, cycloalkyl, or aromatic (including hetero), $R_2$ is hydrogen, aromatic, lower aliphatic, or phenyl-lower alkyl, Y is an alkylene group having from 1–5 carbon atoms, and X is a heterocyclic secondary amino group, having potent analgesic activity.

---

This application is a continuation-in-part application of my copending application Ser. No. 877,822, filed Nov. 18, 1969, now U.S. Pat. No. 3,636,111 which application is a continuation-in-part application of my application Ser. No. 714,450, filed Mar. 20, 1968, now abandoned, which application is a continuation-in-part application of my copending application Ser. No. 680,048, filed Nov. 2, 1967, now abandoned.

This invention relates to new chemical compounds. More particularly, it relates to carbamoyl oximes. Still more particularly, it relates to carbamoyl esters of oximes having the structure

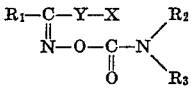

wherein $R_1$ and $R_3$ are cycloalkyl or aromatic groups, and may be the same or different, $R_2$ is hydrogen, phenyl, lower alkyl, lower alkenyl, phenyl-lower alkyl, Y is an alkylene group having from 1–5 carbon atoms, and X is a heterocyclic amino group such as pyrrolidino, piperidino, homopiperidino, morpholino, thiomorpholino, piperazino, or N-methylpiperazino, and their pharmaceutically acceptable non-toxic acid addition salts.

Lower alkyl groups include straight chain or branched alkyl radicals having from 1–5 carbon atoms, such as methyl, ethyl, propyl, isopropyl, butyl t-butyl, amyl, isoamyl and the like.

The lower alkenyl group has from 2–5 carbon atoms and includes vinyl, propenyl, allyl, isopropenyl, and the like.

Included within the scope of cycloalkyl groups are cycloalkyl groups per se having from 3–6 carbon atoms as well as lower alkyl substituted cycloalkyl and cycloalkyl-lower alkyl groups.

Lower alkoxy groups include straight chain or branched alkoxy radicals having from 1–5 carbon atoms, such as methoxy, ethoxy, propoxy, isopropoxy, butoxy, t-butoxy and the like.

The aromatic group in $R_1$ and $R_3$ includes such radicals as phenyl, α-naphthyl, β-naphthyl, phenyl-lower alkyl, and the like, which groups along with the $R_2$ phenyl group may be substituted with such radicals as lower alkyl, lower alkoxy, halogen, hydroxy, amino, dialkylamino, thiol, nitro, hydroxy-lower alkyl, lower alkoxy-lower alkyl, dialkylamino-lower alkyl, dialkylamino-lower alkoxy, cyano, haloalkyl and carboxyl; and heterocyclic radicals such as pyridyl, pyridyl-lower alkyl, furyl, furfuryl, quinolyl, isoquinolyl, imidazolyl, benzimidazolyl, thienyl, and the like, which heterocyclic radicals may be similarly substituted.

Within the scope of X, the piperidino, morpholino, thiomorpholino, pyrrolidino, homopiperidino, and piperazino groups may carry such substituents as lower alkyl, lower alkoxy, hydroxy, hydroxy-lower alkyl, lower alkoxy-lower alkyl, and carbalkoxy.

The Y alkylene group may be a straight chain or branched, such as methylene, ethylene, propylene, 1-methyl-ethylene and 2-methyl-ethylene and the like.

It is known to chemists that the carbamoyl esters of oximes of this invention may exist in either one or both of two geometric configurations; one being syn and the other anti. Either or both structures are contemplated as being within the scope of this invention.

Suitable pharmaceutically acceptable non-toxic acid addition salts include the hydrochloride, hydrobromide, phosphate, sulfate, acetate, lactate, malate, succinate, maleate, malonate, citrate, benzoate, cinnamate, mandelate, nicotinate, salicylate, acetylsalicylate, and the like.

Compounds wherein $R_2$ is hydrogen are prepared by condensing at ambient temperature in an inert solvent an oxime having the structure

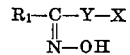

with an isocyanate having the structure $$R_3\text{—}N\text{=}C\text{=}O$$

wherein $R_1$, $R_3$, Y and X are the same as above.

The compounds wherein $R_2$ is lower alkyl are prepared by condensing at ambient temperature in an inert solvent an oxime having the structure

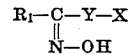

with a carbamoyl chloride having the structure

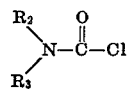

wherein $R_1$, $R_3$, Y and X are the same as above and $R_2$ is lower alkyl.

The acid addition salts are conveniently prepared by mixing equimolar amounts of the free base of the carbamoyl ester of the oxime with the desired acid in an inert solvent, such as ether.

The oximes are prepared according to the methods described in my application Ser. No. 680,015, filed Nov. 2, 1967, now abandoned, or as described by Mannich et al., Berichte, 55, 356 (1921).

The following examples illustrate the best mode contemplated by the inventor for carrying out the invention but are not to be construed as limiting the scope thereof.

EXAMPLE I

O-(4-Methoxyphenylcarbamoyl)-3-Pyrrolidinopropiophenone Oxime Hydrochloride

To a solution of 26.0 g. (0.174 mole) of 4-methoxyphenylisocyanate in 700 ml. of benzene was added 38.0 g. (0.174 mole) of 3-pyrrolidinopropiophenone oxime. The mixture was stirred at room temperature. The solution was evaporated to a viscous residue which was dissolved in 75 ml. ethanol, treated with 40 ml. saturated ethanolic hydrogen chloride, followed by addition of 1 liter of ether. The white solid was filtered, washed with ether and dried to give 64 g. of crude product. The crude solid was recrystallized from warm methanol and ether and then from warm (45°) water to give 35 g. product, m.p. 156–159°.

EXAMPLE II

O-(4-Methoxyphenyl-Carbamoyl)-3-Piperidinopropiophenone Oxime Hydrochloride

A mixture of 19.35 g. of 3-piperidinopropiophenone oxime and 12.46 g. of 4-methoxyphenylisocyanate in 200 ml. benzene was stirred for 2 hours. The solution was evaporated to give a residue which was dissolved in 40 ml. methanol, treated with 100 ml. methanolic hydrogen chloride (1.3 N) and 300 ml. ether. The resulting solid was filtered, washed with ether and dried to give 33 g. of crude product. Recrystallization of the solid from methanol and ether gave 28.0 g. of product, m.p. 180–4° (dec.).

EXAMPLE III

O-[N-Ethyl-N-(4-Dimethylaminophenyl)Carbamoyl]-3-Pyrrolidinopropiophenone Oxime Hydrochloride To a mixture of 9.6 g. of 3-pyrrolidinopropiophenone oxime and 10.1 g. of N-ethyl-N-(4-dimethylaminophenyl)-carbamoyl chloride was added 150 ml. of pyridine and the resulting solution was left at room temperature. The solution was treated with 150 ml. ether and refrigerated to complete the crystallization process. The crystals were filtered, washed with ether and recrystallized twice from methanol and ether to give 6.5 g. of product, m.p. 187–90°.

EXAMPLE IV

O-(4-Dimethylaminophenylcarbamoyl)-4'-Chloro-3-Pyrrolidinopropiophenone Oxime Dihydrochloride A mixture of 7.8 g. of 4-chloro-3-pyrrolidinopropiophenone oxime and 5.0 g. of 4-dimethylaminophenylisocyanate in 500 ml. benzene was stirred at room temperature. The solution was evaporated to give a residue which was dissolved in 200 ml. ether and treated with 15 ml. saturated ethanolic hydrogen chloride. The resulting solid was filtered, washed with ether and dried to give 9 g. of crude product. The solid was recrystallized twice from methanol and ether to give 7.0 g. of product, m.p. 168–171°.

EXAMPLE V

O-(4-Methoxyphenylcarbamoyl)-4'-Nitro-3-Pyrrolidinopropiophenone Oxime Hydrochloride To a solution of 22.8 g. of 4-methoxyphenylisocyanate in 200 ml. of dimethylformamide was added 40.0 g. of 3-pyrrolidino-4'-nitro-propiophenone oxime. The mixture was stirred until solution was complete and then allowed to stand at room temperature. The solution was evaporated to a viscous residue, which was taken up in 100 ml. isopropanol. The isopropanol solution was made acid with 4 N isopropanolic HCl. The resulting yellow solid was filtered and washed with ether to give 65.0 g. of product which was recrystallized from dimethylformamide and ether to give 49.2 g. of product, m.p. 197–200°.

EXAMPLE VI

O-[N-(4-Methoxyphenyl)-N-Methylcarbamoyl]-4'-Nitro-3-Pyrrolidinopropiophenone Oxime Hydrochloride To a suspension of 20.0 g. of O-(4-methoxyphenylcarbamoyl)-4'-nitro-3-pyrrolidinopropiophenone oxime hydrochloride in 100 ml. dimethylformamide, cooled to between 0° and −5° C., 3.7 g. of sodium hydride was added slowly. The reaction was allowed to warm to room temperature, and stirred vigorously for ¾ hour. The reaction was cooled again to between 0 and −5° C. and 5.6 g. of dimethyl sulfate was added. The reaction mixture was allowed to come to room temperature, with stirring for about 1 hour. 200 ml. toluene was added with stirring. 50 ml. $H_2O$ was then added and the organic layer was separated, washed with 25 ml. $H_2O$ and dried over $MgSO_4$. The organic layer was evaporated to about ⅓ of its volume, and then acidified with isopropanolic HCl. Ether was added to turbidity. On standing, a yellow solid precipitated. It was filtered and washed with ether to give 3.3 g. of product, which was recrystallized from dimethylformamide to give 1.7 g. of product. M.P. 197–199° C.

EXAMPLE VII

O-[N-Ethyl-N-(4-Methoxyphenyl)Carbamoyl]-4'-Nitro-3-Pyrrolidinopropiophenone Oxime Hydrochloride To a solution of 6.5 g. of ethyl-4-methoxyphenylcarbamoyl chloride in 100 ml. pyridine, was added 8.0 g. of 3-pyrrolidino-4'-nitropropiophenone oxime. The reaction mixture was stirred until solution was complete, and then allowed to stand at room temperature. 1.5 volumes of ether was added, and the mixture allowed to stand until crystallization was complete. 13.6 g. of product was recrystallized from ethanol to yield 7.8 g. of product. M.p. 181–184° C.

In accordance with the processes described in the examples, the following compounds, in the form of either salts or free bases, were prepared.

| $R_1$ | $R_2$ | $R_3$ | Y | X |
|---|---|---|---|---|
| Ph | H | 4-MeO-Ph | $(CH_2)_2$ | Morpholino. |
| Ph | H | 4-MeO-Pho | $(CH_2)_2$ | Homopiperidino. |
| Ph | H | 4-MeO-Ph | $(CH_2)_2$ | N-methylpiperazino. |
| Ph | H | 4-MeO-Ph | $(CH_2)_3$ | Pyrrolidino. |
| Ph | H | Cyclohexyl | $(CH_2)_3$ | Do. |
| 4-MeO-Ph | H | ...do... | $(CH_2)_3$ | Do. |
| Ph | H | ...do... | $(CH_2)_3$ | Piperidino. |
| Ph | H | ...do... | $(CH_2)_3$ | Homopiperidino. |
| Ph | H | 4-Cl-Ph | $(CH_2)_3$ | Pyrrolidino. |
| 4-Cl-Ph | H | Ph | $(CH_2)_3$ | Do. |
| 2-Py | H | Ph | $(CH_2)_3$ | Piperidino. |
| 2-Th | H | Ph | $(CH_2)_3$ | Pyrrolidino. |
| Ph | H | Ph | $(CH_2)_3$ | 2-Me-piperidino. |
| Ph | H | 4-MeO-Ph | $(CH_2)_3$ | Do. |
| Ph | H | 4-MeS-Ph | $(CH_2)_3$ | Pyrrolidino. |
| Ph | H | 4-$(Me)_2$N-Ph | $(CH_2)_3$ | Do. |
| 4-Cl-Ph | Me | 4-MeO-Ph | $(CH_2)_3$ | Do. |
| 4-Cl-Ph | Pr | 4-MeO-Ph | $(CH_2)_3$ | Do. |
| 4-Cl-Ph | Allyl | 4-MeO-Ph | $(CH_2)_3$ | Do. |

NOTE.—Ph=phenyl, Py=pyridyl, Th=thienyl, Fu=furyl.

The carbamoyl esters of the oximes of this invention have a high degree of analgesic activity, the highest activity being shown by those compounds where $R_1$ is 4-nitro-phenyl, $R_3$ is 4-methoxyphenyl, $R_2$ is lower alkyl and X is pyrrolidino.

A number of compounds wherein both $R_1$ and $R_3$ are phenyl exhibit potent anticonvulsant activity. Many of the compounds also exhibit hypotensive activity. In particular, the compound O-(4-methoxyphenylcarbamoyl)-3-pyrrolidinopropionphenone oxime shows good activity. Likewise, many compounds show topical anesthetic activity, the best effects being observed when $R_1$ is phenyl or 4-chlorophenyl and $R_3$ is cycloalkyl, such as cyclohexyl.

Using the hot plate method of Eddy and Leimbach, J. Pharmacol. Expt'l. Therap., 107, 385 (1953), for determining analgesic activity, the following results were obtained when representative compounds of this invention were administered subcutaneously in mice:

| $R_1$ | $R_2$ | $R_3$ | X | $E.D._{50}$ dose, mg./kg. |
|---|---|---|---|---|
| Y=—$(CH_2)_2$ | | | | |
| Ph | H | 4-MeS-Ph | Pyrrolidino | 4 |
| Ph | H | 4-$(Me_2)$N-Ph | do | 3 |
| 4-Cl-Ph | H | 4-$(Me_2)$N-Ph | do | 4 |
| 4-Cl-Ph | Allyl | 4-MeO-Ph | do | 3 |
| Ph | H | 4-MeO-Ph | do | 4 |
| Ph | H | 4-MeO-Ph | Piperidino | 4 |
| Ph | H | 4-MeO-Ph | Homopiperidino | 8 |
| 4-$NO_2$-Ph | Me | 4-MeO-Ph | Pyrrolidino | 0.01 |
| 4-$NO_2$-Ph | Et | 4-MeO-Ph | do | 0.04 |

The compounds of the present invention are administered orally, parenterally, rectally, or topically. Oral administration is in solid or liquid unit dosage forms such as tablets, capsules, powders, granules, syrups, elixirs, and the like, containing suitable quantities of the desired compound either as the salt or free base.

Powders are quite simply prepared by comminuting the active compound to a suitably fine size and mixing with a similarly comminuted diluent. The diluent can be an edible carbohydrate material such as starch. Advantageously, a sweetening agent or sugar is present as well as flavoring oil.

Granules for reconstitution into a liquid oral preparation are prepared utilizing water-soluble diluents. An active compound and a water soluble diluent such as sucrose, glucose, and the like, is wetted with a binder such as acacia mucilage, gelatin solution, methycellulose solution and forced through a screen to form granules which are allowed to dry. Advantageously, a suspending agent as tragacanth is included in the composition.

Capsules are made by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the desired compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets.

Advantageously the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of desired compound for administration.

A syrup is prepared by suspending the active compound in a suitably flavored aqueous sucrose solution. Similarly, an elixir is prepared utilizing a hydro-alcoholic vehicle.

For parenteral administration, aqueous and oleaginous fluid unit dosage forms can be prepared. In preparing the parenteral form, a measured amount of the active compound is placed in a vial, the vial and its contents sterilized and sealed. An accompanying vial of sterile water is provided as a vehicle to form a suspension prior to administration. Advantageously the sterile water can have dissolved therein a local anesthetic and buffering agent.

In addition to oral and parenteral administration, the rectal route can be utilized. The active compound can be administered by means of a suppository. A vehicle which has a melting point at about body temperature or one that is readily miscible can be utilized. For example, cocoa butter and various polyethylene glycols can serve as the vehicle. Advantageously, a buffer is included in the solid and liquid composition to aid in preventing the hydrolysis of the compound. Alkaline buffers such as calcium carbonate, sodium bicarbonate, and the like can be used in the manner known in the art to provide an alkaline environment.

Topical compositions may be conveniently prepared in the form of creams by mixing the desired active compound with polyethylene glycol 400 and propylene glycol using a filler such as titanium dioxide. Desirably, a disinfectant, such as butylated hydroxytoluene may be added.

In effecting analgesia in mammals a selected compound in a desired formulation is administered to the animal suffering from pain in an amount sufficient to induce a state of analgesia. In humans, individual daily dosages may range from about 5–15 mg. when the compound is administered parenterally and from about 30–60 mg. when administered orally. However, the individual unit dose and frequence of administration will be determined not only by the nature and severity of the subject's pain for which induction of a state of analgesia is desired, but in addition by the age, weight and species of subject, its underlying physical condition and the route of administration, as well as the activity of the compound being administered. It will, accordingly, be within the professional judgment and skill of the practitioner administering the drug to determine the exact amount to be administered such as to be non-toxic, yet sufficient to induce a state of analgesia in the subject.

I claim:

1. A compound of the structure $$\begin{array}{c} R_1-C-Y-X \\ \| \\ N-O-C-N \end{array} \begin{array}{c} R_2 \\ \diagdown \\ \diagup \\ R_3 \end{array}$$
$$\phantom{N-O-}\|$$
$$\phantom{N-O-}O$$

wherein
  $R_1$ is cycloalkyl having from 3 to 6 carbon atoms, phenyl, lower alkylphenyl, lower alkoxyphenyl, halophenyl, nitrophenyl, or naphthyl,
  $R_2$ is hydrogen, lower alkyl, lower alkenyl, phenyl or lower alkoxy-phenyl,
  $R_3$ is cycloalkyl having from 3 to 6 carbons, phenyl, lower alkyl-phenyl, lower alkoxyphenyl, lower alkyl-thiophenyl, halophenyl, di-(lower alkyl)-aminophenyl or naphthyl,
  Y is an alkylene group having 2 or 3 carbon atoms, and
  X is pyrrolidino or 2-methylpyrrolidino, and
their pharmaceutically acceptable, non-toxic acid addition salts.

2. A compound according to claim 1, wherein $R_1$ is phenyl.

3. A compound according to claim 1, wherein $R_1$ is 4-nitrophenyl.

4. A compound according to claim 1, wherein $R_3$ is p-lower alkoxyphenyl.

5. A compound according to claim 4, wherein $R_3$ is p-methoxyphenyl or p-ethoxyphenyl.

6. A compound according to claim 4, wherein $R_2$ is hydrogen.

7. A compound according to claim 1, wherein
  $R_1$ is phenyl,
  $R_2$ is hydrogen,
  $R_3$ is p-methoxyphenyl,
  Y is ethylene, and
  X is pyrrolidino.

8. A compound according to claim 1 wherein
  $R_1$ is phenyl,
  $R_2$ is ethyl,
  $R_3$ is 4-(dimethylamino)-phenyl,
  Y is ethylene, and
  X is pyrrolidino.

9. A compound according to claim 1 wherein
  $R_1$ is 4-chlorophenyl,
  $R_2$ is allyl,
  $R_3$ is 4-methoxyphenyl,
  Y is ethylene, and
  X is pyrrolidino.

10. A compound according to claim 1 wherein
  $R_1$ is phenyl,
  $R_2$ is hydrogen,
  $R_3$ is 4-(dimethylamino)-phenyl,
  Y is ethylene, and
  X is pyrrolidino.

11. A compound according to claim 1 wherein
$R_1$ is 4-nitrophenyl,
$R_2$ is methyl,
$R_3$ is 4-methoxyphenyl,
Y is ethylene, and
X is pyrrolidino.

12. A compound according to claim 1 wherein
$R_1$ is 4-nitrophenyl,
$R_2$ is ethyl,
$R_3$ is 4-methoxyphenyl,
Y is ethylene, and
X is pyrrolidino.

References Cited
UNITED STATES PATENTS
3,063,823   11/1962   Kuhle et al. _____ 260—566

HENRY R. JILES, Primary Examiner
B. DENTZ, Assistant Examiner

U.S. Cl. X.R.
260—309, 309.2, 283 R, 243 B; 424—246, 258, 273